United States Patent
Chen et al.

(10) Patent No.: US 7,931,376 B2
(45) Date of Patent: Apr. 26, 2011

(54) BEAM COMBINING DEVICE AND PROJECTOR HAVING SUCH BEAM COMBINING DEVICE

(75) Inventors: Sung-Nan Chen, Hsin-Chu (TW); Chao-Shun Chen, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 345 days.

(21) Appl. No.: 12/359,134

(22) Filed: Jan. 23, 2009

(65) Prior Publication Data
US 2009/0231549 A1    Sep. 17, 2009

(30) Foreign Application Priority Data
Mar. 14, 2008    (TW) ................................ 97109004 A (51) Int. Cl.
*G02B 27/18*    (2006.01)
*G02B 27/28*    (2006.01)
(52) U.S. Cl. ................... 353/20; 353/31; 353/81; 349/9
(58) Field of Classification Search ............ 353/20, 353/30, 31, 33, 81, 84; 349/8, 9; 348/742, 348/744; 359/629, 634, 638
See application file for complete search history.

(56) References Cited

U.S. PATENT DOCUMENTS

| | | | |
|---|---|---|---|
| 4,826,299 A | 5/1989 | Powell | |
| 5,790,305 A | 8/1998 | Marcellin-Dibon | |
| 7,857,456 B2 * | 12/2010 | Liao et al. | 353/31 |
| 2005/0190562 A1 | 9/2005 | Keuper | |
| 2011/0032487 A1 * | 2/2011 | Inoko | 353/20 |

* cited by examiner

*Primary Examiner* — Kevin Pyo
(74) *Attorney, Agent, or Firm* — Kirton & McConkie; Evan R. Witt (57) ABSTRACT

A beam combining device and a projector having such a beam combining device are provided. The projector includes a first color light source, a second color light source, a third color light source, a beam combining device, a light valve and a projection unit. The first color light source, the second color light source and the third color light source respectively emit first, second and third color beams. The beam combining device includes a polarization state converting module, a color separation unit and a polarization beam splitter. The optical path lengths of the first color beam emitted from the first color light source to the polarization beam splitter, the second color beam emitted from the second color light source to the polarization beam splitter, and the third color beam emitted from the third color light source to the polarization beam splitter are equal.

14 Claims, 4 Drawing Sheets

BEAM COMBINING DEVICE AND PROJECTOR HAVING SUCH BEAM COMBINING DEVICE

FIELD OF THE INVENTION

The present invention relates to a beam combining device and a projector having such a beam combining device, and more particularly to a beam combining device for mixing three primary color beams that are emitted by three primary color light sources of a projector, in which the optical path lengths of the color beams propagated in the beam combining device are equal.

BACKGROUND OF THE INVENTION

With rapid development of digitalized techniques, projectors become essential electronic appliances in many applications. For example, projectors may be used for making presentations, holding meetings or giving lectures in classrooms, boardrooms or conference rooms. Recently, projectors may be used for viewing movies in home theaters or projecting images in home-use TV game consoles. For enhancing operating performance and fulfilling visual enjoyment, most projectors have large-sized screen for projecting images thereon.

Generally, projectors are operated with associated devices or hardware components such as desktop computers, notebook computers, document cameras projectors, DVD drives, TV game consoles, TV sets and the like. After the projectors are communicated with associated devices or hardware components, the signals or images outputted from these devices or hardware components may be projected on a screen for playback. For example, a projector may be used for making a presentation in a meeting. When the projector is communicated with a notebook computer, the presentation data file contained in the notebook computer may be synchronously outputted and projected onto the projection screen so as to directly display images of the presentation data file in real-time.

Figure 1A:
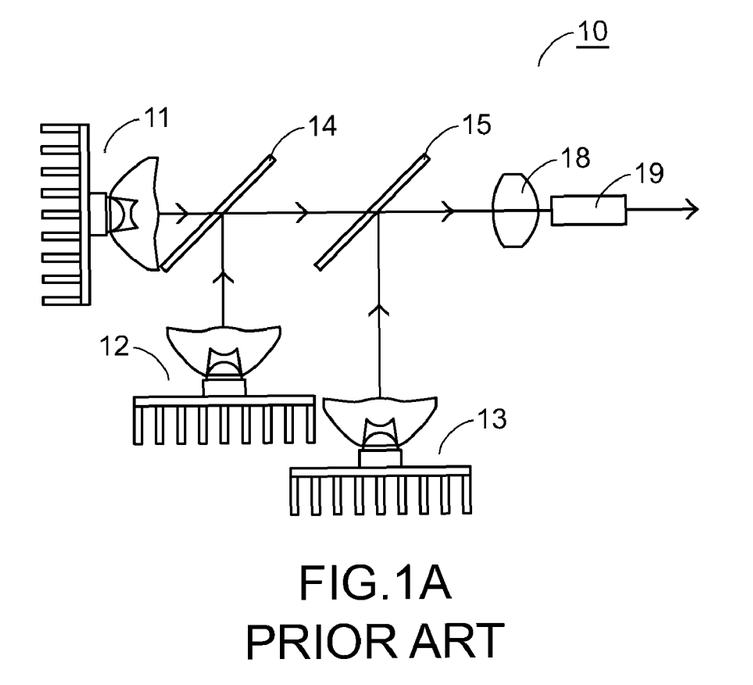
FIG. 1A is a schematic view illustrating the internal components of a conventional projector 10.

FIG. 1A is a schematic view illustrating the internal components of a conventional projector 10. As shown in FIG. 1A, the projector 10 principally includes three color light sources 11, 12 and 13 for respectively emitting three primary color beams, i.e. a red beam, a green beam and a blue beam. That is, the color light sources 11, 12 and 13 are a red light source, a green light source and a blue light source, respectively. By means of two filters 14 and 15, the red, green and blue beams are transmitted or reflected. After processed by the filters 14 and 15, the red, green and blue beams are focused by a condenser lens 18. The focused red, green and blue beams are then subject to homogenization by a homogenizer or an integrator rod 19. The homogenized beams are then projected out of the projector 10. As known, the integration rod 19 is a beam shaper capable of homogenizing or beam-shaping the light beams that passes through the beam shaper. By means of the integration rod 19, the resulting beam may exhibit an accurate color tone, a desired shape and a desired covering area.

Figure 1B:
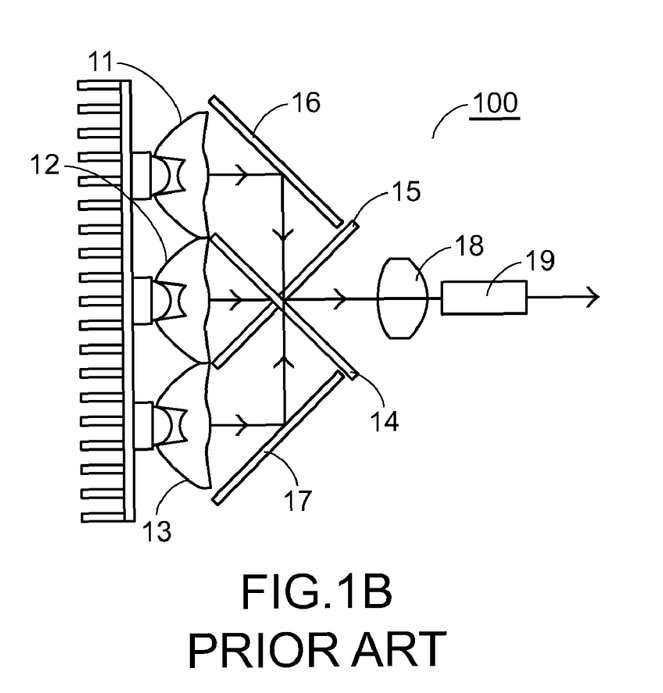
FIG. 1B is a schematic view illustrating the internal components of another conventional projector 100.

FIG. 1B is a schematic view illustrating the internal components of another conventional projector 100. The conventional projector 100 is a variation of the projector 10 of FIG. 1A and some components of these two projectors 10 and 100 are identical. Likewise, the projector 100 has three color light sources 11, 12 and 13 for respectively emitting three primary color beams. By means of two filters 14 and 15 and two addition mirrors 16 and 17, the red, green and blue beams are transmitted or reflected. Likewise, the projector 100 has a condenser lens 18 and an integration rod 19 to focus and homogenize these three beams. The configurations of the projector of FIG. 1B are disclosed in for example US Patent Publication No. US2005/0190562A1, and the contents of which are hereby incorporated by reference.

In the projectors of FIGS. 1A and 1B, after the three primary color beams are emitted, the three primary color beams are subject to homogenization by the integrator rod 19. Since the non-homogenized color beams are subject to a series of reflection and transmission processes before reaching the integrator rod 19, the errors generated during the reflection and transmission processes are usually amplified or the resulting beams are usually diffused. Under this circumstance, the integrator rod 19 needs to have a bulky volume in order to simultaneously homogenize these color beams. In other words, the overall volume of the projector is increased.

Figure 2A:
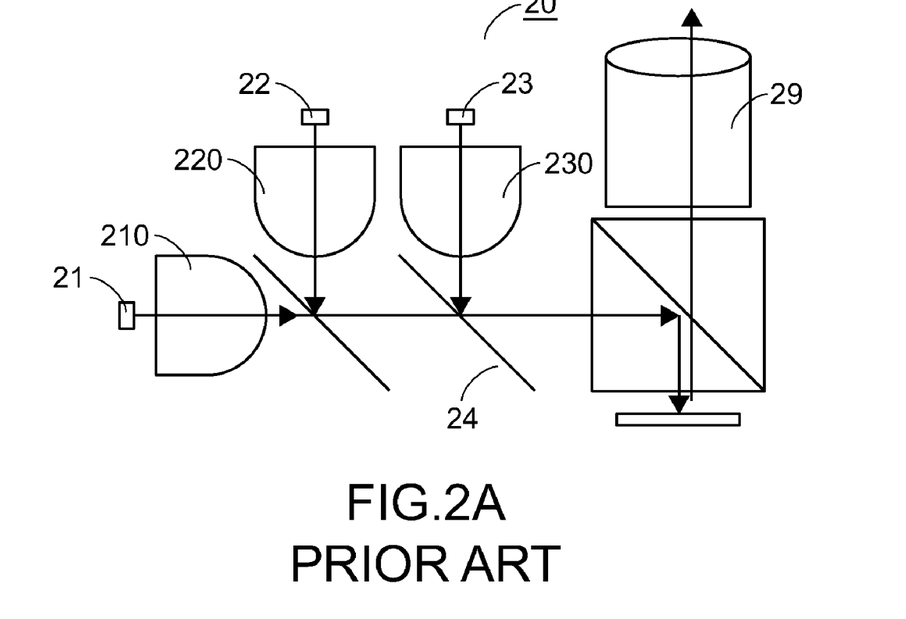
FIG. 2A is a schematic view illustrating the internal components of a modified projector 20 according to the prior art.

For solving these drawbacks, the components inside the projector have been modified. FIG. 2A is a schematic view illustrating the internal components of a modified projector 20 according to the prior art. Likewise, the projector 20 has three color light sources 21, 22 and 23 for respectively emitting three primary color beams. The projector 20 further includes three free-form lenses 210, 220 and 230, which are respectively in front of the color light sources 21, 22 and 23, for homogenizing the color beams emitted by the color light sources 21, 22 and 23. After homogenized by the free-form lenses 210, 220 and 230, the primary color beams (i.e. red, blue and blue beams) are transmitted through or reflected by the filters 24, reflected by a light valve, and then projected out of the projector 20 through a lens of a projection unit 29.

Figure 2B:
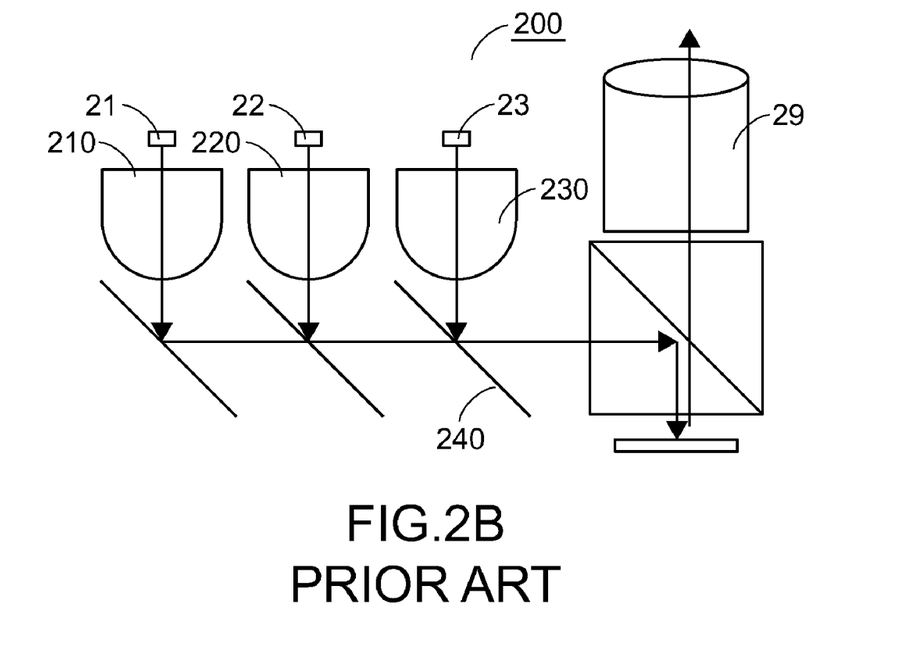
FIG. 2B is a schematic view illustrating the internal components of another modified projector 200 according to the prior art.

FIG. 2B is a schematic view illustrating the internal components of another modified projector 200 according to the prior art. The projector 200 is a variation of the projector 20 of FIG. 2A and some components of these two projectors 20 and 200 are identical. In comparison, the locations of the color light sources 21, 22, 23 and the free-form lenses 210, 220, 230 are distinguished. In addition, the projector 200 has an additional filter 240 to change the optical path for projection. The configurations of the projector of FIG. 2B are disclosed in for example U.S. Pat. Nos. 4,826,299 and 5,790,305, and the contents of which are hereby incorporated by reference.

In the projectors of FIGS. 2A and 2B, after the three primary color beams are homogenized, the three primary color beams are subject to a series of reflection and transmission processes and projected out of the projector. Since the three free-form lenses are arranged in front of corresponding color light sources, the smaller-sized free-form lenses are sufficient to homogenize these three color beams. Under this circumstance, the overall volume of the projector is reduced.

The internal configurations of the projectors of FIGS. 2A and 2B, however, still have some drawbacks. For example, the light path lengths or the optical path lengths of the color beams from the color light sources to the light valve are not completely equal. As shown in FIG. 2A, the optical path length of the color beam from the color light source 21 or 22 is larger than the optical path length of the color beam from the color light source 23. As shown in FIG. 2B, the optical path length of the color beam from the color light source 21 is larger than the optical path length of the color beam from the color light source 22 or 23. In a case that optical path lengths are not completely equal, the brightness values of the color beams to be projected are not uniformly distributed. For example, when three primary colors (i.e. the red, green and blue beams) are mixed to produce a white beam, the resulting white is often suffered from chromatic aberration due to the non-uniform brightness values. That is, the resulting beam has a red shift or a blue shift. In some circumstances, the colors of resulting image are shown as non-uniformly distributed loops and the color uniformity is deteriorated.

SUMMARY OF THE INVENTION

The present invention provides a beam combining device and a projector having such a beam combining device. The projector has three primary color light sources for emitting three primary color beams. The color beams are transmitted or reflected by the beam combining device, and the optical path lengths of the color beams propagated in the beam combining device are equal. Consequently, the image mixed by the three primary color beams has uniform brightness values without chromatic aberration.

Other objectives and advantages of the present invention will be further understood from the further technological features disclosed by the embodiments of the present invention.

For achieving one or some or all of the above-mentioned objectives or other objectives, the present invention provides a beam combining device.

In accordance with an embodiment of the present invention, there is provided a beam combining device for use with a projector. The projector includes a first color light source, a second color light source and a third color light source for respectively emitting first, second and third color beams in a first polarization state. The beam combining device includes a polarization state converting module, a color separation unit and a polarization beam splitter. The polarization state converting module is arranged in the propagating paths of the first, second and third color beams for converting the first, second and third color beams in the first polarization state into a second polarization state. The second and third color beams are permitted to be transmitted through the polarization state converting module but the first color beam is permitted to be reflected by the polarization state converting module. The color separation unit is disposed at a side of the polarization state converting module and arranged in the propagating paths of the second and third color beams. The second color beam is permitted to be transmitted through the color separation unit but the third color beam is permitted to be reflected by the color separation unit, so that the second and third color beams are directed to the polarization state converting module. The polarization beam splitter is disposed at another side of the polarization state converting module and arranged in the propagating paths of the first, second and third color beams. The first color beam in the first polarization state is permitted to be transmitted through the polarization beam splitter and directed to the polarization state converting module. The first, second and third color beams that are converted into the second polarization state by the polarization state converting module are reflected by the polarization beam splitter.

In accordance with another embodiment of the present invention, there is provided a projector. The projector includes a first color light source, a second color light source, a third color light source, a beam combining device, a light valve and a projection unit. The first color light source emits a first color beam in a first polarization state. The second color light source emits a second color beam in the first polarization state. The third color light source emits a third color beam in the first polarization state. The beam combining device is arranged between the first, second and third color light sources for converting the first, second and third color beams in the first polarization state into a second polarization state. The optical path lengths of the first, second and third color beams propagated in the beam combining device are equal.

The light valve is arranged at a side of the beam combining device for reflecting the first, second and third color beams that are converted into the second polarization state by the beam combining device, and converting the first, second and third color beams in the second polarization state into the first polarization state. The projection unit is arranged at another side of the beam combining device for projecting the first, second and third color beams that are converted into the first polarization state by the light valve.

The beam combining device and the projector in accordance with the embodiment of the present invention are capable of homogenizing the color beams that are emitted by the color light sources, so that the overall volume of the projector is reduced. Since the optical path lengths of the three primary color beams (i.e. the red, green and blue beams) are equal, the brightness values and the uniformity of the color beams to be projected are enhanced and the chromatic aberration is overcome. By using the beam combining device and the projector of the present invention, the image mixed by the three primary color beams has uniform brightness values.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be located in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
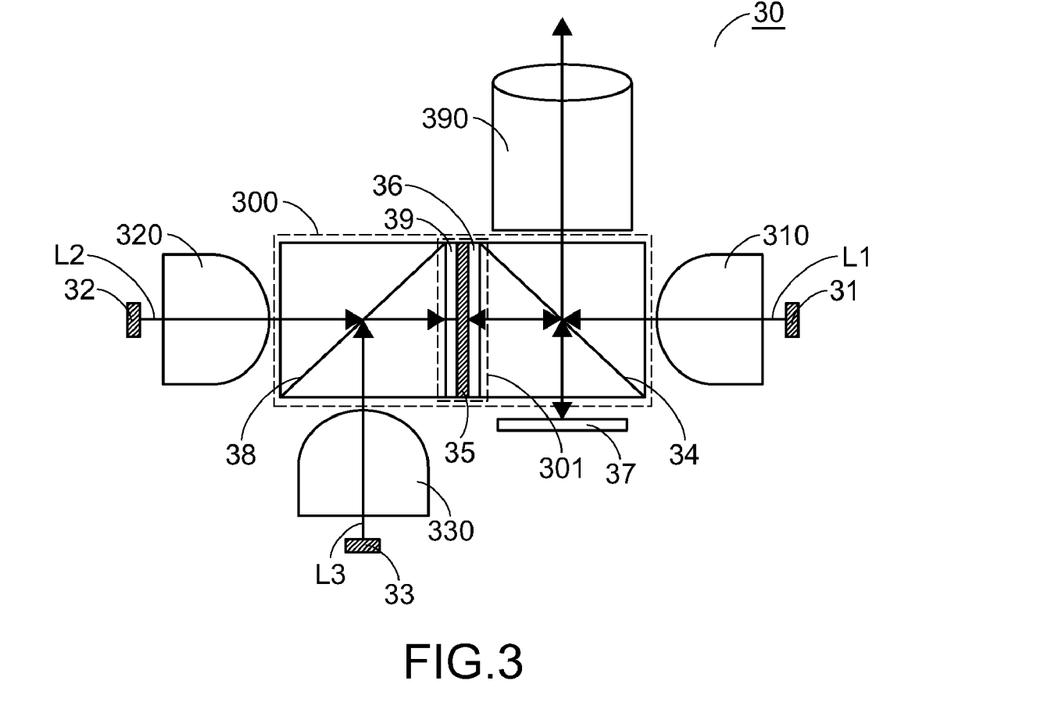
FIG. 3 is a schematic view illustrating the internal components of a projector 30 according to an embodiment of the present invention.

FIG. 3 is a schematic view illustrating the internal components of a projector 30 according to an embodiment of the present invention. As shown in FIG. 3, the projector 30 principally includes a first color light source 31, a second color light source 32 and a third color light source 33, a beam combining device 300, a light valve 37 and a projection unit 390. In this embodiment, the color light sources 31, 32 and 33 respectively emit a first color beam L1, a second color beam L2 and a third color beam L3, which are all in a first polarization state. The color light sources as described in the conventional projectors may be used as the color light sources 31, 32 and 33. Moreover, the color light sources 31, 32 and 33 may be light emitting diodes (LEDs) or laser sources. In an embodiment, the first color beam L1, the second color beam L2 and the third color beam L3 emitted by the first color light source 31, the second color light source 32 and the third color light source 33 are three primary color beams, i.e. a blue beam, a red beam and a green beam. The beam combining device 300 is arranged between the color light sources 31, 32 and 33. In accordance with a key feature of the present invention, the optical path lengths of the first color beam L1, the second color beam L2 and the third color beam L3 propagated in the beam combining device 300 are equal. After processed by the beam combining device 300, the first color beam L1, the second color beam L2 and the third color beam L3 are converted from a first polarization state into a second polarization state. The light valve 37 is arranged beside the beam combining device 300. The first color beam L1, the second color beam L2 and the third color beam L3 that are converted into the second polarization state by the beam combining device 300 are reflected by the light valve 37. After the color beams L1, L2 and L3 are reflected by the light valve 37, the polarization state of the color beams L1, L2 and L3 is converted from the second polarization state into the first polarization state. The projection unit 390 is disposed at another side of the beam combining device 300. The first color beam L1, the second color beam L2 and the third color beam L3 that have been reflected by the light valve 37 and in the first polarization state are projected out of the projector 30 through the projection unit 390. Moreover, the projector 30 further includes three free-form lenses 310, 320 and 330. The free-form lens 310 is arranged between the first color light source 31 and the beam combining device 300 in order to homogenize the first color beam L1 emitted by the first color light source 31. The free-form lens 320 is arranged between the second color light source 32 and the beam combining device 300 in order to homogenize the second color beam L2 emitted by the first color light source 32. The free-form lens 330 is arranged between the third color light source 33 and the beam combining device 300 in order to homogenize the third color beam L3 emitted by the third color light source 33. After homogenized by the free-form lenses 310, 320 and 330, the color beams L1, L2 and L3 are directed to the beam combining device 300. The configurations of the beam combining device 300 will be illustrated in more details as follows.

Please refer to FIG. 3 again. In this embodiment, the beam combining device 300 includes a polarization state converting module 301, a polarization beam splitter (PBS) 34 and a color separation unit 38. The polarization state converting module 301 is arranged in the propagating paths of the color beams L1, L2 and L3. By the polarization state converting module 301, the color beams L1, L2 and L3 in the first polarization state is converted into the second polarization state. In addition, the second color beam L2 and the third color beam L3 are permitted to be transmitted through the polarization state converting module 301 but the first color beam L1 is permitted to be reflected by the polarization state converting module 301. The color separation unit 38 is disposed at a side of the polarization state converting module 301 and arranged in the propagating paths of the second color beam L2 and the third color beam L3. The second color beam L2 is permitted to be transmitted through the color separation unit 38 but the third color beam L3 is permitted to be reflected by the color separation unit 38. Consequently, the second color beam L2 and the third color beam L3 are directed to the polarization state converting module 301. The polarization beam splitter 34 is disposed at another side of the polarization state converting module 301 and arranged in the propagating paths of the color beams L1, L2 and L3. The first color beam L1 in the first polarization state is permitted to be transmitted through the polarization beam splitter 34 and directed to the polarization state converting module 301. The color beams L1, L2 and L3 in the second polarization state are reflected by the polarization beam splitter 34. In this embodiment, the polarization state converting module 301 includes a first color filter 35, a first quarter-wave plate 36 and a second quarter-wave plate 39.

Figure 4A:
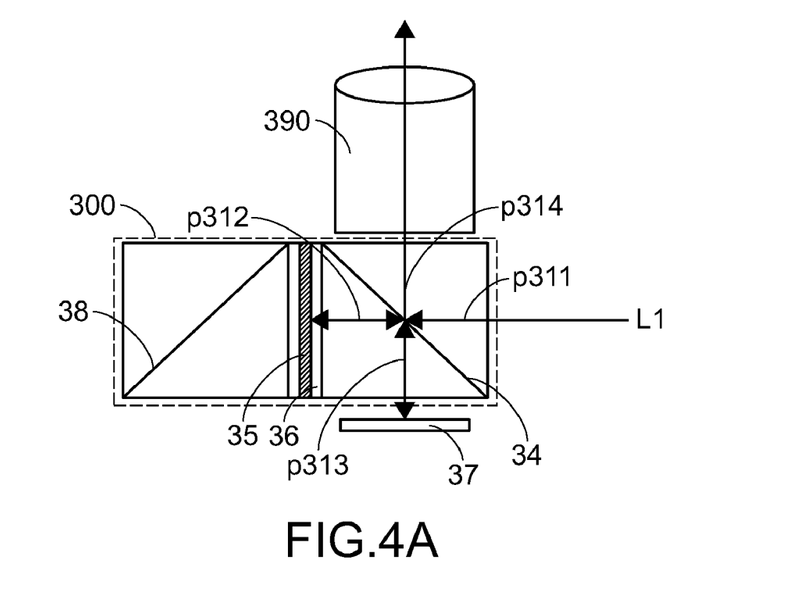
FIG. 4A is a schematic view illustrating the optical path of the blue beam L1 emitted by the first color light source 31 shown in FIG. 3.

FIG. 4A is a schematic view illustrating the optical path of the blue beam L1 emitted by the first color light source 31 shown in FIG. 3. In this embodiment, the polarization beam splitter 34 is a PBS prism or a PBS plate. In a case that the polarization beam splitter 34 is a PBS prism, the first polarization state is a P-polarization state and the second polarization state is an S-polarization state, the P-polarized beam is permitted to be transmitted through the polarization beam splitter 34 but the S-polarized beam is permitted to be reflected by the polarization beam splitter 34. In another case that the polarization beam splitter 34 is a PBS plate, the first polarization state is an S-polarization state and the second polarization state is a P-polarization state, the S-polarized beam is permitted to be transmitted through the polarization beam splitter 34 but the P-polarized beam is permitted to be reflected by the polarization beam splitter 34. Take a PBS prism as the polarization beam splitter 34 for example. The P-polarized blue beam L1 is directed to a first side of the polarization beam splitter 34 along the optical path p311. Along the optical paths p311 and p312, the P-polarized blue beam L1 is transmitted through the polarization beam splitter 34 and then emerged from a second side of the polarization beam splitter 34.

In this embodiment, the first color filter 35 and the first quarter-wave plate 36 are arranged between the polarization beam splitter 34 and the color separation unit 38, and the first quarter-wave plate 36 is arranged between the polarization beam splitter 34 and the first color filter 35. The first color filter 35 is designed such that only the first color beam L1 (e.g. the blue beam) emitted by the first color light source 31 may be reflected by the first color filter 35. As such, the blue beam L1 is directed to the first color filter 35 along the optical path p312 through the first quarter-wave plate 36, and then reflected by the first color filter 35 back to the optical path p312. Since the blue beam L1 passes through the first quarter-wave plate 36 twice by reflection, an effect similar to transmission of the blue beam L1 through a half-wave plate is rendered. Under this circumstance, the polarization state of the blue beam L1 is switched by a 90-degree polarization angle difference. In other words, after the P-polarized blue beam L1 is reflected by the first color filter 35 and passes through the first quarter-wave plate 36 twice, an S-polarized beam is directed to the polarization beam splitter 34. As shown in FIG. 4A, if the polarization direction of the P-polarized blue beam L1 to be directed to a first side of the polarization beam splitter 34 along the optical path p311 is perpendicular to the propagating direction of the P-polarized blue beam L1 but parallel with the page surface, the polarization direction of the S-polarized blue beam L1, which has the 90-degree polarization angle difference and is reflected to the optical path p312, is parallel with the propagating direction of the blue beam L1 but perpendicular to the page surface.

As mentioned above, since the P-polarized beam is permitted to be transmitted through the polarization beam splitter 34 but the S-polarized beam is permitted to be reflected by the polarization beam splitter 34, the S-polarized blue beam L1 fails to be transmitted through the polarization beam splitter 34 but is reflected by the polarization beam splitter 34. Along the optical paths p312 and p313, the S-polarized blue beam L1 that is reflected by the polarization beam splitter 34 is emerged from a third side of the polarization beam splitter 34 of the beam combining device 300 and directed to the light valve 37. An example of the light valve 37 is a reflective liquid crystal on silicon (LCoS). The light valve 37 has stored therein the image data to be projected. When light beams are irradiated on the light valve 37, the image data are projected out of the projector 30. Moreover, after an incident beam is reflected by the light valve 37, the reflected beam is switched by a 90-degree polarization angle difference with respect to the incident beam. That is, after the blue beam L1 is reflected by the light valve 37 back to the optical path p313, the polarization state of the blue beam L1 is converted from the S-polarization state to the P-polarization state.

According to the characteristics of the polarization beam splitter 34, the blue beam L1 is permitted to be transmitted through the polarization beam splitter 34 and emerged from a fourth side of the polarization beam splitter 34 along the optical paths p313 and p314, so that the blue beam L1 is projected out of the projector 30 through the lens of the projection unit 390.

Figure 4B:
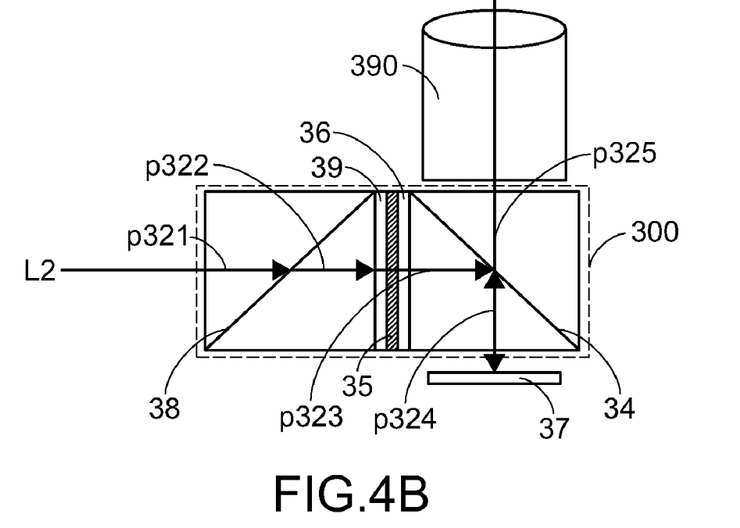
FIG. 4B is a schematic view illustrating the optical path of the red beam L2 emitted by the second color light source 32 shown in FIG. 3.

FIG. 4B is a schematic view illustrating the optical path of the red beam L2 emitted by the second color light source 32 shown in FIG. 3. In this embodiment, the red beam L2 emitted by the second color light source 32 is in a P-polarization state. The P-polarized red beam L2 is directed to a first side of the color separation unit 38 along the optical path p321. An exemplary color separation unit 38 is a dichroic prism or a dichroic mirror. Along the optical paths p321 and p322, the P-polarized red beam L2 is transmitted through the color separation unit 38 and then emerged from a second side of the color separation unit 38.

In this embodiment, the second quarter-wave plate 39 is arranged between the second side of the color separation unit 38 and the first color filter 35. As previously described, the first color filter 35 is designed such that only the blue beam L1 emitted by the first color light source 31 is permitted to be reflected by the first color filter 35 but the red beam L2 and the green beam L3 are permitted to be transmitted through the first color filter 35. As such, along the optical paths p322 and p323, the red beam L2 is successively transmitted through the second quarter-wave plate 39, the first color filter 35 and the first quarter-wave plate 36 and then directed to the second side of the polarization beam splitter 34. Since the red beam L2 passes through two quarter-wave plates 39 and 36, an effect similar to transmission of the red beam L2 through a half-wave plate is rendered. Under this circumstance, the polarization state of the red beam L2 is switched by a 90-degree polarization angle difference. In other words, after the P-polarized red beam L2 passes through the polarization state converting module 301, the polarization state of the red beam L2 is converted from the P-polarization state to the S-polarization state. The relation between the P-polarization state and the S-polarization state is illustrated in FIG. 4A, and is not redundantly described herein.

Like the blue beam L1, the S-polarized red beam L2 that is propagated along the optical path p323 is reflected by the polarization beam splitter 34 along the optical path p324, emerged from the third side of the polarization beam splitter 34, and reflected by the light valve 37 back to the optical path p324. After the red beam L2 is reflected by the light valve 37 back to the optical path p324, the polarization state of the red beam L2 is converted from the S-polarization state to the P-polarization state. According to the characteristics of the polarization beam splitter 34, the red beam L2 is permitted to be transmitted through the polarization beam splitter 34 and emerged from a fourth side of the polarization beam splitter 34 along the optical paths p324 and p325, so that the red beam L2 is projected out of the projector 30 through the lens of the projection unit 390.

In accordance with another feature in accordance with the embodiment of the present invention, the optical path lengths of the blue beam L1 and the red beam L2 that are respectively emitted from the color light sources 31 and 32, injected into the beam combining device 300, reflected by the polarization beam splitter 34 and projected by the projection unit 390 are equal. Please refer to FIGS. 4A and 4B. In this embodiment, the polarization beam splitter 34 and the color separation unit 38 are accommodated within respective receptacles that have the same dimension. In addition, the polarization beam splitter 34 and the color separation unit 38 have the same tilting angle, the distance between the first color light source 31 and the beam combining device 300 is equal to the distance between the second color light source 32 and the beam combining device 300, and the quarter-wave plates 39 and 36 have the same thickness. In other words, the total optical path length of the blue beam L1 propagated in the beam combining device 300 (i.e. the total length of the optical path p311, the double of the optical path p312, the double of the optical path p313 and the optical path p314) is equal to the total optical path length of the red beam L2 propagated in the beam com-bining device 300 (i.e. the total length of the optical path p321, the optical path p322, the optical path p323, the double of the optical path p324 and the optical path p325).

Figure 4C:
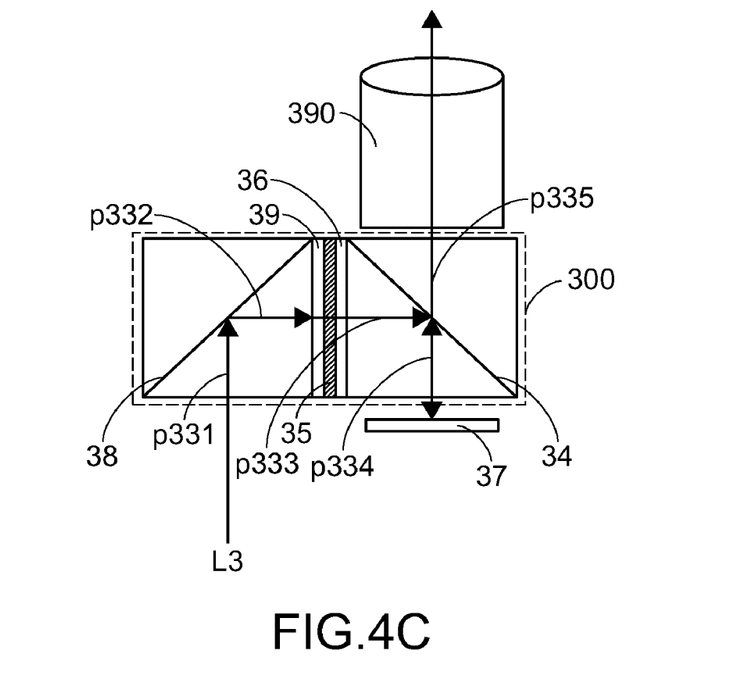
FIG. 4C is a schematic view illustrating the optical path of the green beam L3 emitted by the third color light source 33 shown in FIG. 3.

FIG. 4C is a schematic view illustrating the optical path of the green beam L3 emitted by the third color light source 33 shown in FIG. 3. In this embodiment, the green beam L3 emitted by the third color light source 33 is in a P-polarization state. The P-polarized green beam L3 is directed to the third side of the color separation unit 38 along the optical path p331. Along the optical paths p331 and p332, the P-polarized green beam L3 is reflected by the color separation unit 38 and then emerged from a second side of the color separation unit 38.

Moreover, the point of the color separation unit 38 where the green beam L3 is projected at and the point of the color separation unit 38 where the red beam L2 is projected at are overlapped with each other. In other words, the green beam L3 and the red beam L2 are projected on the same point of the color separation unit 38. The red beam L2 and the green beam L3 are combined together at the second side of the color separation unit 38 along the optical paths p322 and p332. The P-polarized red and green beams are successively transmitted through the second quarter-wave plate 39, the first color filter 35 and the first quarter-wave plate 36, and then directed to the second side of the polarization beam splitter 34 along the optical paths p323 and p333, respectively. After the P-polarized red and green beams passes through the polarization state converting module 301, the polarization state of the red and green beams is converted from the P-polarization state to the S-polarization state. Afterwards, the S-polarized green beam L3 that is propagated along the optical path p333 is reflected by the polarization beam splitter 34 along the optical path p334. After the green beam L3 is reflected by the light valve 37 back to the optical path p334, the polarization state of the green beam L3 is converted from the S-polarization state to the P-polarization state. According to the characteristics of the polarization beam splitter 34, the green beam L3 is permitted to be transmitted through the polarization beam splitter 34 and emerged from a fourth side of the polarization beam splitter 34 along the optical paths p334 and p335, so that the green beam L3 is projected out of the projector 30 through the lens of the projection unit 390.

Although the green beam L3 and the red beam L2 are incident into different sides of the color separation unit 38, the total optical path length of the green beam L3 propagated in the beam combining device 300 is equal to the total optical path length of the red beam L2 propagated in the beam combining device 300 due to the corresponding incident locations of the green and red beams. As shown in FIGS. 4B and 4C, the total optical path length of the green beam L3 indicates the total length of the optical path p331, the optical path p332, the optical path p333, the double of the optical path p334 and the optical path p325; and the total optical path length of the red beam L2 indicates the total length of the optical path p321, the optical path p322, the optical path p323, the double of the optical path p324 and the optical path p325.

In conclusion, the blue beam L1, the red beam L2 and the green beam L3 are incident into the beam combining device 300 through the first side of the polarization beam splitter 34, the first side of the color separation unit 38 and the third side of the color separation unit 38, respectively. The blue beam L1, the red beam L2 and the green beam L3 are emerged from the third side of the polarization beam splitter 34 of the beam combining device 300 and directed to the light valve 37. After reflected by the light valve 37, the blue beam L1, the red beam L2 and the green beam L3 are emerged from the fourth side of the polarization beam splitter 34 and projected out of the projector 30 through the projection unit 390. In particular, the optical path lengths of the blue beam L1, the red beam L2 and the green beam L3 that are propagated in the beam combining device 300 are equal.

From the above description, it is found that the beam combining device and the projector in accordance with the embodiment of the present invention are capable of homogenizing the color beams that are emitted by the color light sources. As a consequence, the overall volume of the projector is reduced. Since the optical path lengths of the three primary color beams (i.e. the red, green and blue beams) are equal, the brightness values and the uniformity of the color beams to be projected are enhanced and the chromatic aberration is overcome. By using the beam combining device and the projector in accordance with the embodiment of the present invention, the image mixed by the three primary color beams has uniform brightness values.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A beam combining device adapted to a projector, the projector comprising a first color light source, a second color light source and a third color light source for respectively emitting a first color beam, a second color beam and a third color beam in a first polarization state, the beam combining device comprising:

a polarization state converting module arranged in the propagating paths of the first color beam, second color beam and third color beam for converting the first color beam, second color beam and third color beam in the first polarization state into a second polarization state, wherein the second beam and the third color beam are permitted to be transmitted through the polarization state converting module but the first color beam is permitted to be reflected by the polarization state converting module;

a color separation unit disposed at a side of the polarization state converting module and arranged in the propagating paths of the second color beam and the third color beam, wherein the second color beam is permitted to be transmitted through the color separation unit but the third color beam is permitted to be reflected by the color separation unit, so that the second color beam and the third color beam are directed to the polarization state converting module; and a polarization beam splitter disposed at another side of the polarization state converting module and arranged in the propagating paths of the first color beam, the second color beam and the third color beam, wherein the first color beam in the first polarization state is permitted to be transmitted through the polarization beam splitter and directed to the polarization state converting module, and the first color beam, the second color beam and the third color beam that are converted into the second polarization state by the polarization state converting module are reflected by the polarization beam splitter.

2. The beam combining device according to claim 1, wherein the polarization state converting module comprises:

a first color filter arranged between the polarization beam splitter and the color separation unit, wherein the second color beam and the third color beam are permitted to be transmitted through the first color filter but the first color beam is permitted to be reflected by the first color filter;

a first quarter-wave plate arranged between the polarization beam splitter and the first color filter, and cooperating with the first color filter to convert the first color beam in the first polarization state into the second polarization state; and a second quarter-wave plate arranged between the color separation unit and the first color filter, and cooperating with the first quarter-wave plate to convert the second color beam and the third color beam in the first polarization state into the second polarization state.

3. The beam combining device according to claim 1, wherein the color beams in a P-polarization state are permitted to be transmitted through the polarization beam splitter but the color beams in an S-polarization state are permitted to be reflected by the polarization beam splitter.

4. The beam combining device according to claim 1, wherein the first polarization state is a P-polarization state, the second polarization state is an S-polarization state, and there is a 90-degree polarization angle difference between the P-polarization state and the S-polarization state.

5. The beam combining device according to claim 4, wherein the second color beam in the P-polarization state is permitted to be transmitted through the color separation unit but the third color beam in the P-polarization state is permitted to be reflected by the color separation unit.

6. The beam combining device according to claim 1, wherein the optical path lengths of the first color beam emitted from the first color light source to the polarization beam splitter, the second color beam emitted from the second color light source to the polarization beam splitter, and the third color beam emitted from the third color light source to the polarization beam splitter are equal.

7. The beam combining device according to claim 1, wherein the first color light source, the second color light source and the third color light source comprise light emitting diodes or laser sources.

8. A projector comprising:

a first color light source for emitting a first color beam in a first polarization state;

a second color light source for emitting a second color beam in the first polarization state;

a third color light source for emitting a third color beam in the first polarization state;

a beam combining device arranged between the first color light source, the second color light source and the third color light source for converting the first color beam, the second color beam and the third color beam in the first polarization state into a second polarization state, wherein the optical path lengths of the first color beam, the second color beam and the third color beam propagated in the beam combining device are equal;

a light valve arranged at a side of the beam combining device for reflecting the first color beam, the second color beam and the third color beam that are converted into the second polarization state by the beam combining device, and converting the first color beam, the second color beam and the third color beam in the second polarization state into the first polarization state; and a projection unit arranged at another side of the beam combining device for projecting the first color beam, the second color beam and the third color beam that are converted into the first polarization state by the light valve.

9. The projector according to claim 8, wherein the light valve is a reflective liquid crystal on silicon.

10. The projector according to claim 8, wherein the first polarization state is a P-polarization state, the second polarization state is an S-polarization state, and there is a 90-degree polarization angle difference between the P-polarization state and the S-polarization state.

11. The projector according to claim 8, wherein the first color light source, the second color light source and the third color light sources comprise light emitting diodes or laser sources.

12. The projector according to claim 8, wherein the beam combining device comprises:

a polarization state converting module arranged in the propagating paths of the first color beam, the second color beam and the third color beam for converting the first color beam, the second color beam and the third color beam in the first polarization state into the second polarization state, wherein the second color beam and the third color beam are permitted to be transmitted through the polarization state converting module but the first color beam is permitted to be reflected by the polarization state converting module;

a color separation unit disposed at a side of the polarization state converting module and arranged in the propagating paths of the second color beam and the third color beam, wherein the second color beam is permitted to be transmitted through the color separation unit but the third color beam is permitted to be reflected by the color separation unit, so that the second color beam and the third color beam are directed to the polarization state converting module; and a polarization beam splitter disposed at another side of the polarization state converting module and arranged in the propagating paths of the first color beam, the second color beam and the third color beam, wherein the first color beam in the first polarization state is permitted to be transmitted through the polarization beam splitter and directed to the polarization state converting module, and the first color beam, the second color beam and the third color beam that are converted into the second polarization state by the polarization state converting module are permitted to be reflected by the polarization beam splitter.

13. The projector according to claim 12, wherein the polarization state converting module comprises:
   a first color filter arranged between the polarization beam splitter and the color separation unit, wherein the second color beam and the third color beam are permitted to be transmitted through the first color filter but the first color beam is permitted to be reflected by the first color filter;
   a first quarter-wave plate arranged between the polarization beam splitter and the first color filter, and cooperating with the first color filter to convert the first color beam in the first polarization state into the second polarization state; and
   a second quarter-wave plate arranged between the color separation unit and the first color filter, and cooperating with the first quarter-wave plate to convert the second color beam and the third color beam in the first polarization state into the second polarization state.

14. The projector according to claim 8, further comprising three free-form lenses, which are respectively arranged between the first color light source, the second color light source and the third color light source and the beam combining device.

* * * * *